Patented May 18, 1943

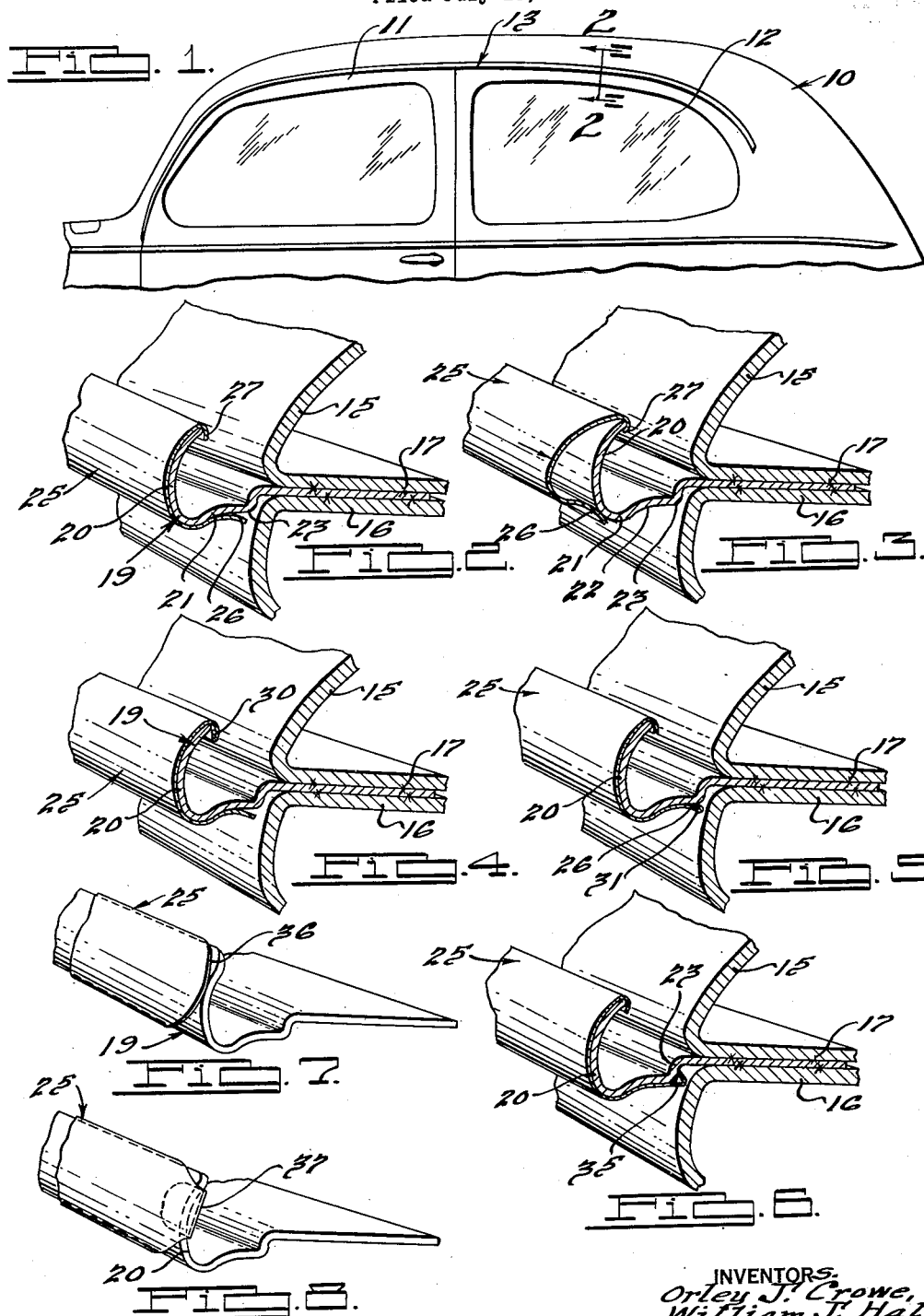

2,319,723

UNITED STATES PATENT OFFICE 2,319,723

DRIP MOLDING

Orley J. Crowe and William J. Hall, Detroit, Mich.

Application July 18, 1940, Serial No. 346,075

4 Claims. (Cl. 41—10)

The invention relates generally to motor vehicles and it has particular relation to drip molding applicable in particular for preventing drainage of water from the vehicle roof downwardly over the sides of the vehicle.

The use of drip molding along the side of the vehicle above the doors and windows therein is known generally, and ordinarily the molding forms a gutter which drains the water to one or both ends of the vehicle and this gutter is fastened to the body usually by welding. Ordinarily, the molding is painted and has the same color as that of the body, but in certain instances a finish or cover strip is applied, such, for example, as disclosed in the copending application of William J. Hall and Joseph L. Shanahan, Serial No. 313,882, filed January 15, 1940. In employing a cover or finish strip, a bright appearance may be obtained by using stainless steel and applying the cover in a snap-on manner. To minimize the cost of the molding, especially in the case where a stainless cover is used, the base or inner part of the molding may be fabricated from an ordinary steel such as cold rolled steel and this inner steel preferably is of heavier gauge and the stainless steel is very thin. The present invention is concerned principally with improvements in drip molding where a stainless steel cover is applied to the inner or base member.

One object of the invention is to provide an improved structure where a snap-on cover is applied, wherein the cover may be applied with greater facility and with less danger of marring or scratching adjacent surfaces.

Another object of the invention is to provide a structure such as mentioned which does not present any sharp edges at the upper edge of the outer wall portion of the molding.

Another object of the invention is to provide an improved drip molding such as mentioned which more completely covers the under surface of the base so as to substantially eliminate exposed surfaces that otherwise would be visible between the cover and the adjacent body part of the vehicle.

Another object of the invention is to provide an improved drip molding such as stated heretofore wherein the ends of the cover are constructed to compensate for variations in length between the inner member and such cover.

Other objects of the invention will become apparent from the specification, from the drawing relating thereto, and from the claims hereinafter set forth.

For a better understanding of the invention, reference may be had to the drawing, wherein:

Figure 1 is a fragmentary view of a vehicle body illustrating drip molding thereon as constructed according to one form of the invention;

Fig. 2 is a cross-sectional view taken substantially along the line 2—2 of Fig. 1;

Fig. 3 is a view similar to Fig. 2 but illustrating the manner in which the cover strip is applied;

Figs. 4, 5, and 6 are views similar to Fig. 2 but showing other forms of the invention;

Figs. 7 and 8 are end views of the molding illustrating two end structures that may be utilized.

Referring to Fig. 1, the vehicle body is illustrated at 10, the door at 11, and a rear window at 12. The drip molding is indicated generally at 13 and extends from a forward part of the body downwardly to the front and to the rear so that water collecting in the molding will drain to the rear and to the front and not downwardly over the sides of the car.

The molding may be fastened to the body by welding and in the arrangement shown, a leg of the inner strip is disposed between two parts 15 and 16 of the body and is welded thereto as indicated at 17. Outwardly of the body, the strip is formed to provide a gutter at 19 comprising an upright wall portion 20 and a base portion 21. As shown clearly in Fig. 3, the base portion 21 is recessed upwardly, as indicated at 22, and adjacent the body, the base portion has an abrupt shoulder 23. This strip as described preferably is constructed of an ordinary steel of low carbon content such as cold rolled steel and is relatively heavy and rigid.

The cover is indicated at 25 and is generally shaped to fit the wall and base portions of the inner strip except that the inner edge of the lower leg of the cover is outwardly flared as indicated at 26 so that it diverges from the base portion of the inner strip once the cover is in place. The upper edge of the upright part of the cover is reversely folded as indicated at 27 and the sides of the folded part sufficiently diverge that the cover may be rocked on the upper edge of the wall 20 during application of the cover. The cover is applied as illustrated in Fig. 3 by hooking its upper edge over the upper edge of the wall 20 and then pressing the cover over the junction of the wall and base portions of the inner strip and causing the lower leg of the cover to snap into place. It is to be noted that the flared edge 26 of the cover greatly facilitates application of the latter in the snap-on manner and that in particular it prevents digging in or engagement of the sharp edge of the cover with the inner strip and furthermore that surfaces of the inner strip are not scratched by such edges. It is advantageous not to scratch the outer surface of the inner strip because in some cases the stainless cover is to be applied and in some cases it is not to be applied and it thus becomes important to avoid scratching of such surfaces since the cover may later be removed. It is further to be noted that the cover extends practically to the side of the body so that gaps are practically eliminated and, therefore, the under side of the molding has the appearance of the cover right up to the body line.

In the structure shown by Fig. 4, the hook shaped upper edge of the cover has its inner wall reversely folded as indicated at 30 and this fold is advantageous in that the hook shaped edge of the cover may be more easily slipped over the upper edge of the wall 20 and again because no sharp edge is present which is exposed for engagement by fingers occasionally gripped over the edge of the molding.

The structure shown by Fig. 5 is like that shown by Fig. 2 excepting that the inner edge of the bottom part of the cover is reversely folded as indicated at 31. This reverse fold at this point also facilitates assembly of the cover and inner strip since there is no sharp edge present for possible engagement with the outer surface of the inner strip, and, moreover, the reverse fold 31 tends to fill the space between the flare 26 and the base portion of the inner strip and therefore tends to eliminate spaces apt to cause whistling noise due to air currents while the vehicle is moving. This structure also might have the reverse fold 30 at the upper edge of the cover if desired.

In the structure shown by Fig. 6, the inner edge of the bottom part of the cover extends upwardly as indicated at 35 and is adapted to snap past the shoulder 23 and to frictionally contact it once the cover is applied. This provides a positive resistance to any movement of the cover away from the inner strip, or, in other words, it more definitely locks the parts in place once the edge 35 moves past the shoulder 23, since its contact with the surface of the shoulder makes it more difficult for the cover to have movement in a loosening direction. Furthermore, this edge arrangement brings the edge of the cover even closer to the vehicle body and eliminates spaces or gaps even more completely.

In the structure shown in Fig. 7, the end of the upright portion of the cover 25 is extended as indicated at 36 so as to present more of an ornamental appearance at the end of the molding. Variations in manufacture, tolerances, etc. very frequently cause the cover to vary in length as compared to the length of the inner strip and by having the upright portion of the cover shaped at its end as indicated at 36, any variations in length are not as noticeable. An alternative end structure is shown in Fig. 8 wherein the upright part of the cover has an extended tab portion 37 which can be bent reversely and toward the inner side of the wall 20 of the inner strip. It will be apparent that more or less of this tab 37 can be bent reversely as mentioned so that depending on differences in length between the cover and the inner strip, more or less of the tab can be bent reversely, thereby causing the cover to approximate the length of the inner strip regardless of the degree of variation in length.

It may be added as a generality that by providing a cover such as mentioned with the diverging folded edge for loosely hooking over the upper edge of the wall 20 of the inner strip and providing the flared lower edge portion 26 on the cover, greater ease of assembly is obtained and this is particularly true where the drip molding has fairly acute bends such as where it bends downwardly at the front and at the rear. In a case of this character, application of a snap-on molding is more difficult due to the fact that any swinging of the cover tends to move one end out of the plane of the molding. The cover has flexibility, however, and this flexibility, coupled with the upper edge characteristic mentioned, which permits free swinging of the cover, along with the flared lower edge portion of the cover, greatly facilitates application of the cover in a snap-on manner even though the molding has a fairly abrupt bend as mentioned.

Although more than one form of the invention has been illustrated and described, it will be apparent to those skilled in the art that various modifications may be made without departing from the scope of the appended claims.

What is claimed is:

1. A drip molding for motor vehicles comprising an inner metal strip having a base portion adapted to be disposed along the side of the vehicle and an outer, upwardly directed wall which jointly with the base portion forms a water drain or gutter, and a relatively thin metal cover having an upright part covering the outer surface of the wall and a lower part covering the base portion of the strip, the upright part of the cover having a narrower end projecting linearly beyond the wall part of the strip and bent towards the inner side of the wall.

2. A drip molding for motor vehicles which has a substantially straight portion and a downwardly bent end portion corresponding generally to the longitudinal body line of the vehicle body, comprising an inner metal strip having a base portion adapted to be disposed along the side of the vehicle and an outer, upwardly directed wall which jointly with the base portion forms a water drain or gutter, and a relatively thin metal cover having an upright part covering the outer surface of the wall and a lower part covering the lower surface of the base portion, said cover having its upper edge portion reversely folded and hooked over the upper edge of the wall with the reverse fold sufficiently wide that the cover can be first hooked over the upper edge of the wall along the straight part of the molding and then swung freely about on such edge to cause the lower part of the cover to move under the base portion of the inner strip and the curved end of the cover to move over the curved end of the strip, said lower part of the cover and the base part of the strip having parts interengaged by snap action when the cover is swung into covering and surface contacting relation to the strip and the free edge portion of the lower part of the cover having a diverging relation to the base part of the strip so that movement of such edge portion past the junction of the base and upright parts of the strip is facilitated and guided.

3. A drip molding for motor vehicles which has a substantially straight portion and a downwardly bent end portion corresponding generally to the longitudinal body line of the vehicle body comprising an inner metal strip having a base portion adapted to be disposed along the side of the vehicle and an outer, upwardly directed wall which jointly with the base portion forms a water drain or gutter, and a relatively thin metal cover having an upright part covering the outer surface of the wall and a lower part covering the lower surface of the base portion, said cover having its upper edge portion reversely folded and hooked over the upper edge of the wall with the reverse fold sufficiently wide that the cover can be first hooked over the upper edge of the wall along the straight part of the molding and then swung freely about on such edge to cause the lower part of the cover to move under the base portion of the inner strip and the curved end of the cover to move over the curved end of the strip, said lower part of the cover and the base part of the strip having parts interengaged by snap action when the cover is swung into covering and surface contacting relation to the strip and the free edge portion of the lower part of the cover having a diverging relation to the base part of the strip and having its edge reversely folded so that movement of such edge portion past the junction of the base and upright parts of the strip is facilitated and guided.

4. A drip molding for motor vehicles which has a substantially straight portion and a downwardly bent end portion corresponding generally to the longitudinal body line of the vehicle body comprising an inner metal strip having a base portion adapted to be disposed along the side of the vehicle and an outer, upwardly directed wall which jointly with the base portion forms a water drain or gutter, and a relatively thin metal cover having an upright part covering the outer surface of the wall and a lower part covering the lower surface of the base portion, said cover having its upper edge portion reversely folded and hooked over the upper edge of the wall with the reverse fold sufficiently wide that the cover can be first hooked over the upper edge of the wall along the straight part of the molding and then swung freely about on such edge to cause the lower part of the cover to move under the base portion of the inner strip and the curved part of the cover to move over the curved end of the strip, said lower part of the cover and the base part of the strip having parts interengaged by snap action when the cover is swung into covering and surface contacting relation to the strip and the free edge portion of the lower part of the cover having a diverging relation to the base part of the strip, and having such edge portion reversely bent to that side next to the base part of the strip so that movement of such edge portion past the junction of the base and upright parts of the strip is facilitated while providing a sharp edge for frictionally contacting the strip and preventing loosening of the cover.

ORLEY J. CROWE.
WILLIAM J. HALL.